July 5, 1955 S. DOMENY 2,712,585
PNEUMATICALLY OPERATED AND CONTROLLED RESISTANCE WELDER
Filed June 8, 1953 3 Sheets-Sheet 2
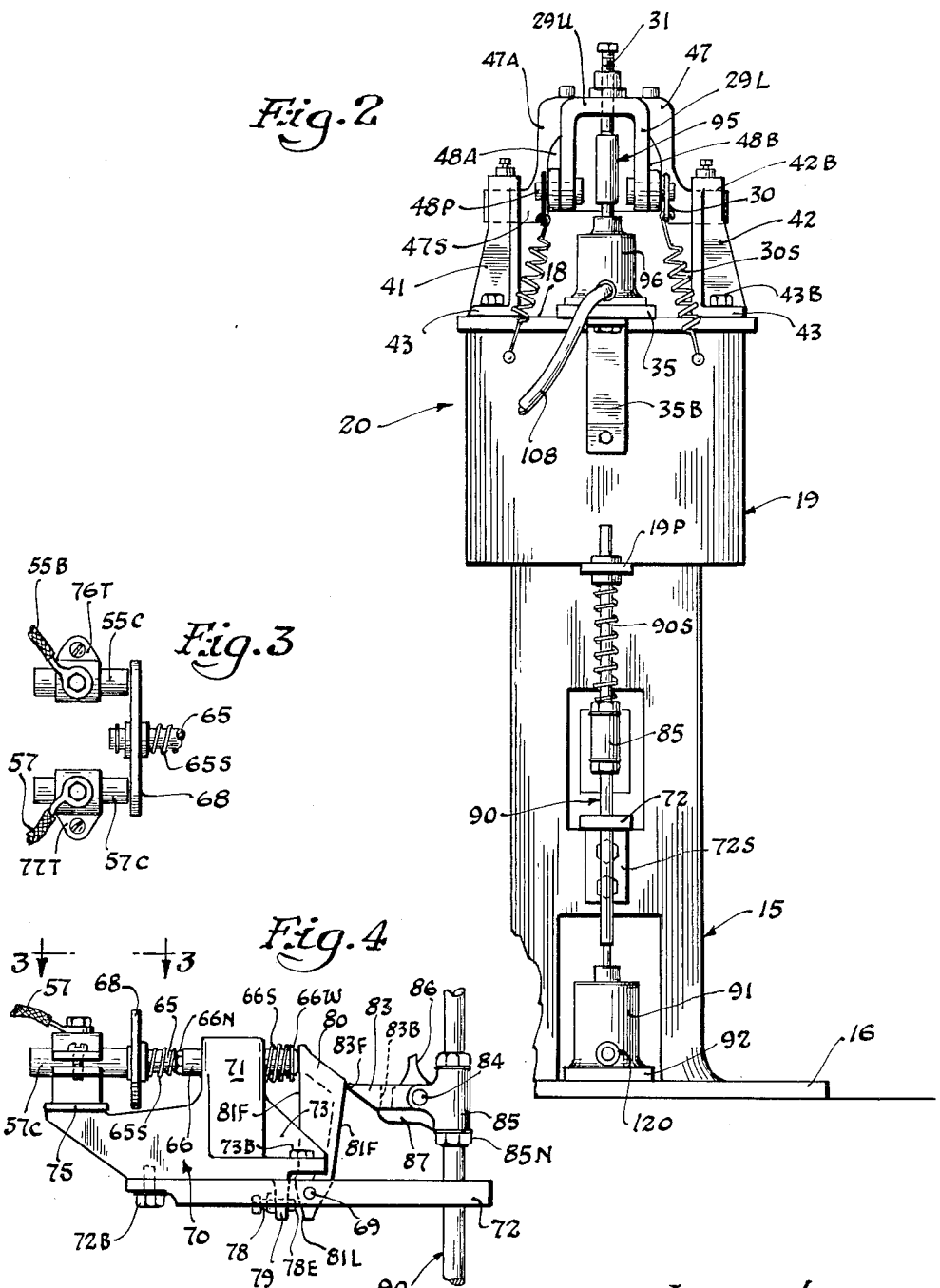
Inventor
Steven Domeny
By
Attorneys

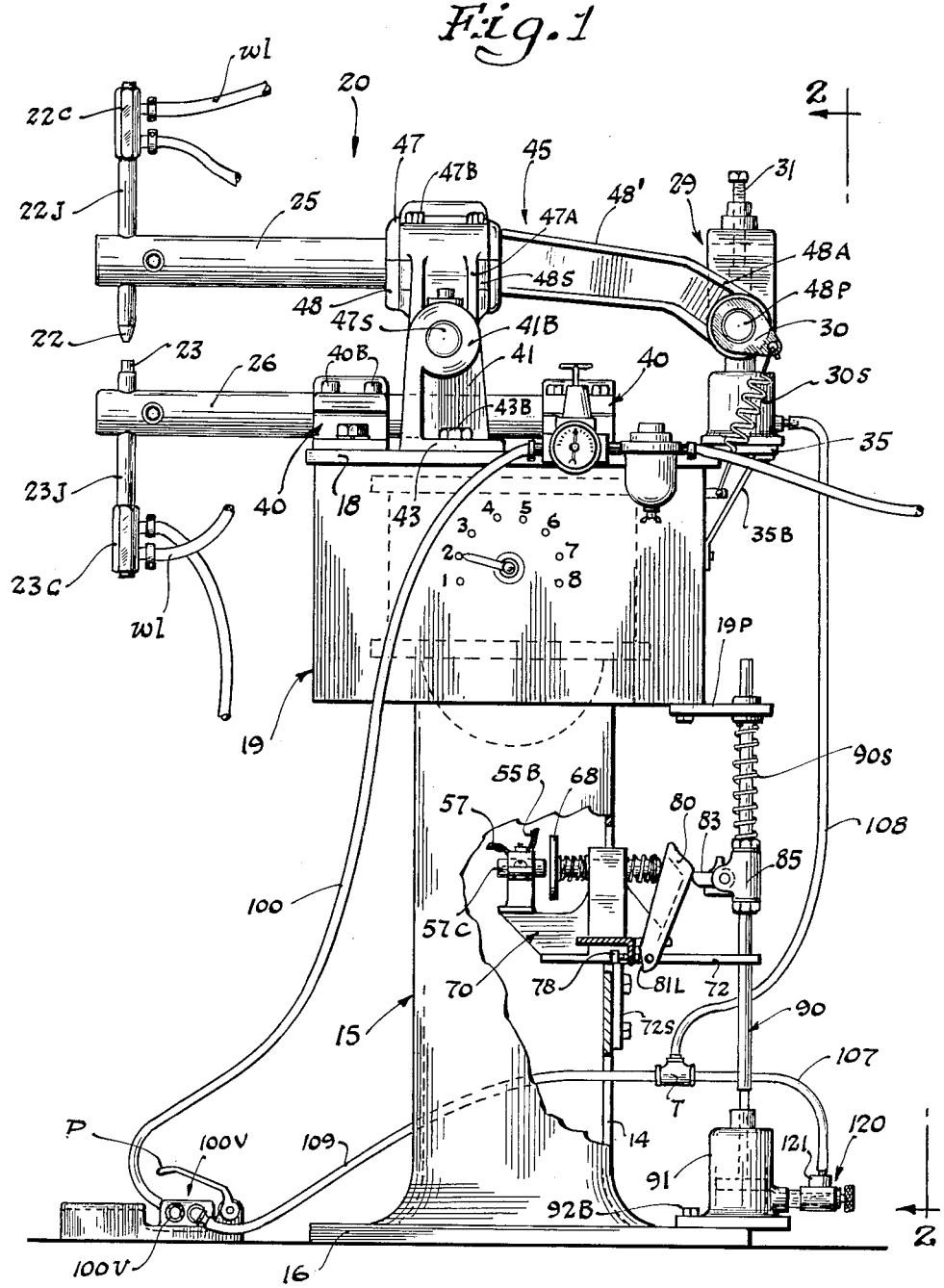

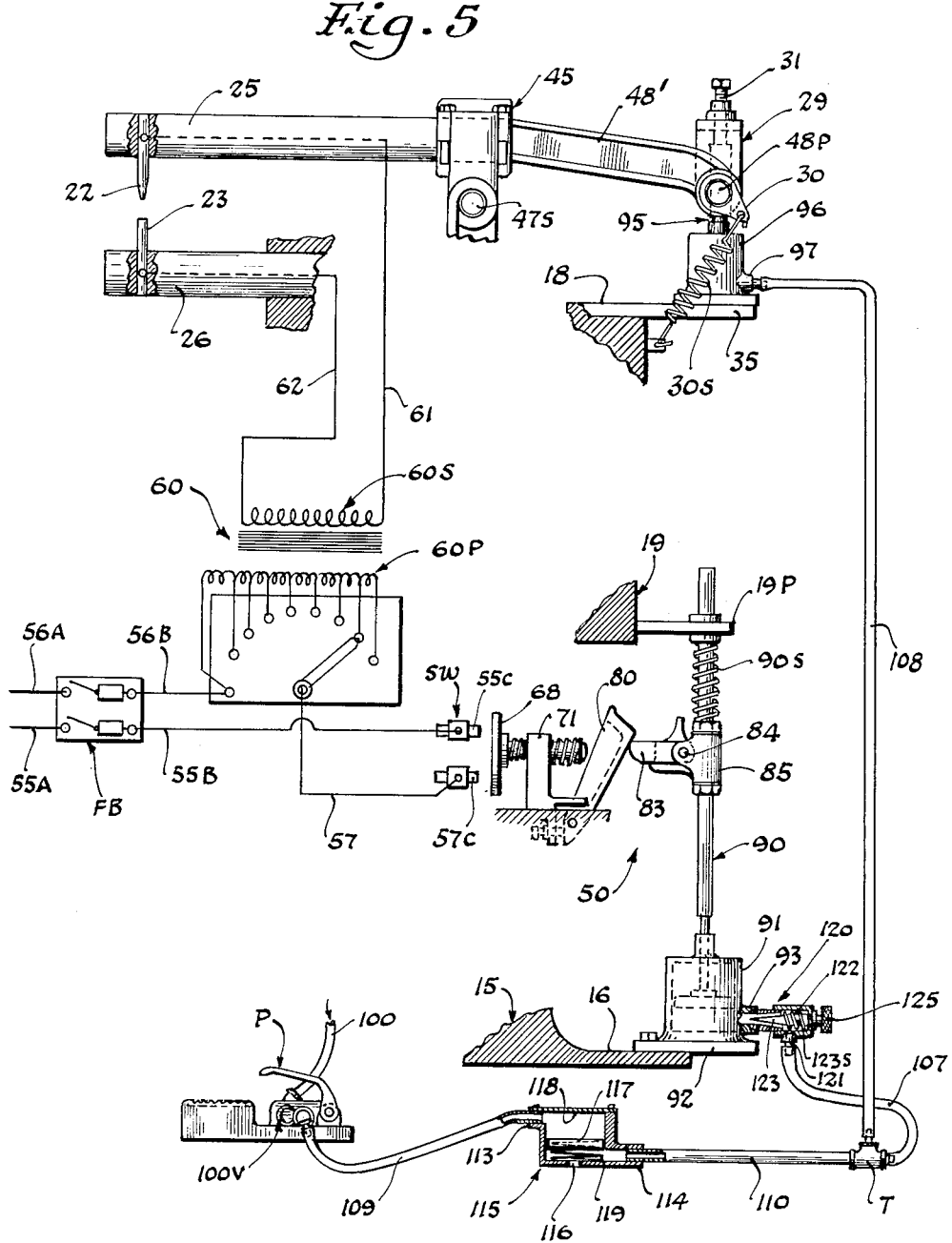

United States Patent Office 2,712,585
Patented July 5, 1955

2,712,585

PNEUMATICALLY OPERATED AND CONTROLLED RESISTANCE WELDER

Steven Domeny, Chicago, Ill., assignor to Ada Metal Products, Chicago, Ill., a corporation of Illinois Application June 8, 1953, Serial No. 360,101

4 Claims. (Cl. 219—4)

This invention relates to a resistance welder and more particularly to a resistance welder that is to be pneumatically operated and controlled.

In the use of resistance welders, the article to be welded is first arranged between a pair of electrodes that are adapted to heat by electrical resistance, and in the course of operation of the welding machine these electrodes are brought toward one another so that a substantial pressure is exerted on opposite sides of the article to be welded, whereupon a current of electricity is caused to flow between the electrodes. As welders of this type have been constructed in the past, the aforesaid pressure that is brought to bear on the article to be welded by the electrodes has been commonly established in most instances by means of a spring actuator arranged for foot control. As a consequence, it is quite difficult to obtain successively uniform pressures with such an arrangement, and one of the objects of the present invention is to so construct and arrange a resistance welder that the article to be welded may be gripped with a predetermined pressure that will remain uniform in successive welding operations.

As was noted above, the welder of the present invention is of the type in which welding temperatures are established through the phenomenon of electrical resistance. Such temperatures are normally quite high, and in order that sufficient current can be made available to attain such temperatures, welders of this type embody a transformer. As a result of thus multiplying the current, it is essential that care be taken to assure that the period during which the transformer is energized is only that required to establish the necessary welding temperature, for otherwise the life of the transformer will be unnecessarily diminished. Timers, or so-called circuit breakers, have been utilized in the past in attempts to assure that current runs through the transformer for the required time only. However, these timers have been relatively insensitive and difficult to control, and as a consequence, damage to the transformer is not an uncommon occurrence in the art. In addition to this, it will be recognized that if the current flows too long, the electrodes will be damaged and the work piece is likely to be damaged or "burned" through altogether. Therefore, a further object of the present invention is to improve upon the sensitivity of welding machine timers by means of a pneumatic control of a particular kind and arrangement, and still a further object of the present invention is to combine the pneumatic means that are used to bring the electrodes together with uniform pressure as outlined above with the pneumatic means that are used as a timer control so that these two means may be associated in a common circuit that is operatively arranged in the resistance welder.

Other and further objects of the present invention will be apparent from the following description and claims and are illustrated in the accompanying drawings which, by way of illustration, show a preferred embodiment of the present invention and the principle thereof and what I now consider to be the best mode in which I have contemplated applying that principle. Other embodiments of the invention embodying the same or equivalent principles may be used and structural changes may be made as desired by those skilled in the art without departing from the present invention.

In the drawings:

Fig. 1 is a side elevation of a resistance welder of the spot welding type embodying the principles of the present invention, the base of the welder being shown as broken away in part;

Fig. 2 is a rear view of the machine shown in Fig. 1;

Fig. 3 is a detail plan view taken on the line 3—3 of Fig. 4;

Fig. 4 is a detail elevation view showing a timer; and

Fig. 5 is a schematic view illustrating diagrammatically the principles of the present invention as arranged in an electrical resistance welder of the spot welding type.

For purposes of disclosure, the invention is illustrated in Figs. 1 to 5 as embodied in a relatively large and heavy resistance welder 20 which in the present instance is adapted for spot welding operations. The welder 20 has a pair of welding electrodes 22 and 23 that are clamped in a vertical opposed relation with respect to one another at the respective ends of a pair of relatively long and heavy arms 25 and 26. These electrode-carrying arms 25 and 26 are individually supported at the top of the welder and have split ends in which the electrodes 22 and 23 are clamped. The upper arm 25 is adapted to be driven with substantial force toward the lower arm 26 by means of a pneumatically controlled piston 95, Fig. 2, and when the welding electrodes 22 and 23 are brought together in this manner a transformer 60, Fig. 5, in the machine is energized by means of a timer 50 which is pneumatically controlled by another piston 90. As will be described in detail below, the two pistons 90 and 95 are both adapted to be driven from a common source of compressed air directed into the machine through a primary line 100, Fig. 5.

During the course of a welding operation, the transformer 60 supplies electrical energy to the electrodes 22 and 23 in a manner to be described below, and as a consequence it is preferable to arrange for cooling the electrodes. To this end, the welding electrodes are each jacketed with water jackets as 22J and 23J, and water is supplied through water lines wl and couplings 22C and 23C.

The electrode-carrying arms 25 and 26, as shown in Fig. 1, are arranged in substantial parallel spaced relation at the top of a housing 19, and it is in this housing that the transformer 60 is mounted. In turn, the transformer housing 19 is supported at the top of a vertical post structure 15 which is of hollow construction. Thus, the supporting post 15 includes a cylindrical vertical wall 14, and in order that the welder may be stabilized on the floor of the shop the bottom of the post 15 is formed with an annular flared-out base plate 16 that affords a relatively large supporting area.

In a welder of this type, one or both of the electrode carrying arms as the arms 25 and 26 are adapted to be driven with force toward one another so that the electrode tips as 22 and 23 may engage the article to be welded with substantial pressure. In the present instance, the lower arm 26 is stationary and this relation is obtained by securing the arm 26 to the top T of the housing 19. In the present instance, this is done by utilizing conventional clamping structures as 40 spaced apart from one another on the top of the housing and each being in the form of U-clamps that are juxtaposed one on the other and tightened about the arm 26 and on the housing 19 by means as bolts 40B.

The other of the arms, 25, is supported above arm 26 for pivotal movement about a horizontal axis, and the means whereby this pivotal relation is attained includes a pair of vertically disposed bearing supports 41 and 42, Fig. 2, having bearings 41B and 42B integrally formed therewith. These bearing supports are each formed with relatively large flat bases 43 which are suitably secured to the top of the housing 19 as by bolts 43B, or otherwise, so that the bearing supports are arranged on the housing 19 in horizontal spaced relation. Rotatably supported in the opposite bearings 41B and 42B is a clamping structure 45 that is relatively long in nature and which is adapted to clamp the rear end of the arm 25 so that the latter may pivot in a vertical plane. The clamp 45 is in the form of a two-piece casting which includes an upper U-clamp 47 and a separate lower U-clamp 48. The two U-clamps thus afforded are arranged about the rear end of the upper arm 25 in juxtaposed relation and the two are fastened together as by bolts 47B which are threadedly engaged in threaded mounting sockets 48S in the lower of the two clamps. Cast integral with the upper clamp 47 on either side thereof are a pair of downwardly extended arms 47A and these arms each include outwardly extended stub shafts as 47S which are journably mounted in the opposed bearings 41B and 42B. It will be apparent that in this manner the upper arm 25 is arranged on the welder for pivotal up and down movement.

The clamp structure 45 for the arm 25 is adapted to be pivoted in the bearing supports 41 and 42 by forces applied to this clamp, and in order that such action may be accomplished the U-clamp 47 includes an integral, rearwardly extended lever arm 48' which has a pair of spaced apart and downwardly inclined extensions 48A and 48B of the rear thereof. Upwardly directed forces from the piston 95 are adapted to be imparted to these extensions of lever arm 48' in a manner now to be described.

The piston 95 is slidably arranged in the usual manner in a corresponding cylinder 96, and the cylinder 96 is supported in an outboard relation at the rear of the housing 19 on a support plate 35 which is stabilized on the housing by means of a bracket 35B. As will be described in more detail below, compressed air is adapted to enter the cylinder 96 through a line 108 connected to an inlet 97 at the rear of the piston 96, and the compressed air that is thus directed into the cylinder 96 has sufficient pressure to cause the piston 95 to travel from a normal or depressed position as shown in the drawings vertically upward in an actuated direction. During such vertical upward movement, the piston 95 causes the electrode carrying arm 25 to be driven forcibly downward in a counterclockwise direction about the pivot afforded by the stub shafts 47S and the corresponding bearing supports 41 and 42, and in order that such movement may be imparted to arm 25, a yoke-like structure 29 is arranged over the upper end of piston 95 and between the rear extensions 48A and 48B on the lever arm 48'.

The yoke 29 is connected to the lever arm 48' and is adapted to be engaged and lifted upwardly by the piston 95 as the latter is actuated and advanced in a vertically upward direction to thereby bring the electrodes 22 and 23 together. Thus, the yoke 29 includes an upper side or bight portion 29U from the opposite sides of which depend a pair of leg members 29L which correspond to the opposite extensions 48A and 48B at the end of the lever arm 48'. The relation is such that the yoke fits within the space between the extensions 48A and 48B as shown in Fig. 2, and headed pins as 48P are passed through the aligned ends of the legs 29L and the extensions 48A and 48B, so that the lever arm 48' is connected in this manner to the yoke 29 to be movable therewith. The outer ends of the pins 48P each mount a washer 30 that is secured to the pin against outward axial movement, and these washers serve to yieldably anchor the rear of the lever arm 48' to the transformer housing 19. Thus, a pair of springs 30S are connected between the housing 19 and the respective washers 30, and in this manner the clamp structure 45 and the electrode-carrying arm 25 are held in a normal clockwise position as shown in Fig. 2 with the welding electrodes 22 and 23 maintained in sufficient spaced relation to permit the work piece to be inserted therebetween by the operator.

It will be clear from the foregoing that when the piston 95 is actuated, upward movement thereof will be imparted to the lever arm 48' through the yoke 29 and the pins 48P, and the electrodes 22 and 23 will thus be brought together as the upper arm 25 advances in a counterclockwise direction toward the lower arm 26. Such action takes place, of course, against the return action of the springs 30S. The manner in which the piston 95 is thus actuated will be described in detail below, but it may be pointed out herein that the extent to which the arm 25 is thus directed downward toward the lower arm 26 may be regulated through an adjusting screw 31 that is mounted in the bight 29U of the yoke 29 in position to be directly engaged by the upper end of the piston 95, thus permitting the effective or driving travel of the piston 95 to be adjusted and regulated with respect to the yoke 29.

When the electrode welding tips 22 and 23 are brought together in a welding relation by actuation of piston 95 as described above, the timing in the welder 20 is such that the transformer 60 is energized, and the means whereby this is accomplished includes a timer 50 which, in accordance with the present invention, is arranged for pneumatic control. Thus, as shown in Fig. 5, the transformer 60 includes a secondary coil 60S, and the terminal wires 61 and 62 of this coil are connected to the electrodes 22 and 23, respectively, and hence when the latter are brought to bear against the opposite sides of the article to be welded, current will flow between the electrodes so long as the transformer 60 remains energized.

The primary coil 60P of the transformer is of the variable type, and this is adapted to be connected to a source of electrical power through a normally open circuit breaker switch SW that is controlled by the timer 50. Thus, a pair of wires 55A and 56A conduct electricity from the source through a fuse box FB. A wire 56B corresponding to the lead-in wire 56A is connected to one end of the primary coil 60P, and a wire 55B corresponding to the lead-in wire 55A leads to a contact 55C of the switch SW. The switch SW includes another contact 57C, and this contact is connected to the other end of the primary coil 60P through a wire 57. As shown in Fig. 5, the contacts 55C and 57C are adapted to be bridged by a switch disk 68 that is included in the timer mechanism 50, and in this manner a circuit may be completed from the source to the primary coil 60P.

Under and in accordance with the present invention, the time during which the switch disk 68 is effective to bridge the contacts 55C and 57C is timed by a timer mechanism which includes a trip lever 80 and a trip 83 that is carried by the piston 90. These two members afford a cam action which is adapted to be regulated in a manner to be described below.

The timer 50 is supported in the interior of the supporting post 15 beneath the transformer 60 and for this purpose includes a supporting structure in the form of a casting 70. The timer is disposed in this relation on a platform 72 that projects outwardly in a horizontal plane at the rear of the post 15, as shown in Fig. 1, and this platform is welded to a supporting plate 72S which in turn is bolted to the back of the post 15. As will be pointed out below, the rear of the platform 72 serves to guide the piston 90 during its vertical travel.

The timer support 70 is mounted on the end of the platform 72 inside the post 15, and for this purpose the support member 70 is formed with a pair of angle mounting brackets 73 at either side which are secured to the platform 72 by means of mounting screws 73B. Other mounting screws as 72B extend through the forward end of the platform 72 and into the base of the support member 70.

The support 70 for the timer 50 includes a platform 75, in an elevated relation above the platform 72, on which is mounted a pair of terminal clamps 76T and 77T, Fig. 3, which correspond to the wires 55B and 57 and which serve to clamp the contacts 55C and 57C in a well known manner to thereby connect these contacts to the respective wires 55B and 57.

Mention was previously made of the fact that the contacts 55C and 57C are adapted to be closed by a switch disc 68 included as part of the timer 50. To thus permit the disc 68 to be operatively associated with the switch SW in this manner, the support 70 is formed with a center guide head 71 that is adapted to guide the switch disk 68 between its normal open position, as shown in Figs. 1 and 5, and its actuated or closed position illustrated in Figs. 3 and 4. Thus, the switch disk 68 is fastened in a suitable manner to one end of a relatively short mounting shaft 65, and the latter is operatively mounted in a slide plunger 66 which in turn is slidably mounted in the guide head 71. A spring 65S is arranged concentrically on the shaft 65 between the disk 68 and a lock nut 66N carried on the inner end of the plunger 66, and another spring 66S is similarly arranged on the slide plunger 66 between the outer side of the guide head 71 and a cap 66W attached to the outer end of the slide plunger. This arrangement for the switch disc 68 affords a lost motion driving movement as will be described below.

The switch SW is adapted to be closed by the switch disc 68 during vertical upward movement of the piston 90, and to this end a trip lever 80 for the slide plunger 66 is pivotally mounted on a pivot pin 69 located in an opening provided in the support plate 72 at the outer side of the guide head 71. The trip lever 80 is formed with a cam surface 81F, Fig. 4, and it is this cam surface which in the present instance is adapted to assist in controlling the time during which the switch disk 68 is effective to close the switch SW. Thus, the cam surface 81F at the back of the trip lever 80 is adapted to be slidably engaged by another cam surface 83F formed on the end of the trip 83 corresponding to the trip lever 80, and the trip 83 is carried by the piston 90 so as to pass opposite and along the cam face 81F at the back of the trip lever during vertical travel of the piston 90. This relation is best illustrated in Fig. 4, and it will be there observed that the trip 83 is mounted on the piston 90 for effective movement in one direction only, namely, during the vertical upward travel of the piston 90. The trip 83 is U-shaped, including a front or bight section 83B, Fig. 4, and the means whereby the trip 83 is thus mounted for a one-way action includes a sleeve 85 located on the piston 90 by lock nuts 85N. The sleeve 85 carries a pivot pin 84 to which the opposite legs of the trip 83 are connected, and the sleeve 85 is also formed with a set of stop lugs 86 and 87 that are adapted to limit movement of the trip 83. Thus, the trip 83 normally rests in a limited counterclockwise position on the stop 87 as shown in Fig. 4, and is free to pivot clockwise on the pin 84 to a position limited by the upper stop lug 86.

The cylinder 91 in which the piston 90 is operatively arranged is attached to the rear of the welder, as shown in Fig. 1, and thus the cylinder 91 includes a base plate 92 that is fastened to the base plate 16 of the welder as by a bolt 92B. The cylinder 91 is thus arranged on the welder so that the piston 90 is guided in its vertical travel in an opening at the outer or rear end of the platform 72 and in another opening that is vertically aligned therewith in an upper guide plate 19P attached to the rear underside of the transformer housing 19.

During vertical upward travel of the piston 90, the trip 83 slides along the back of the trip lever, and reacts against the lower stop lug 87 as the switch disc is thereby advanced in the direction of the switch SW. A return spring 90S is concentrically arranged on the piston 90 between the upper guide plate 19P and the upper of the two lock nuts 85N on the piston 90 so that during such vertical upward travel of the piston the spring 90S will undergo continuous compression. Hence, when the forces sufficient to overbalance the spring 90S are removed from the piston and cylinder arrangement 90—91, the return spring 90S will effect a quick return of the piston 90 to its normal inward position with respect to the cylinder 91. This, of course, is permitted by the freedom of clockwise movement of the trip 83 about the pivot 84 to the limit position defined by the upper stop lug 86.

It will be apparent from the foregoing that the trip lever 80 and the trip 83 carried by the piston 90 are so related that the relative disposition between these two members, coupled with the rate at which the piston 90 is set to travel upwardly, controls the time period during which the switch SW remains closed. Thus, the normal position for the timer 50 is one wherein the cam surface 83F on the trip 83 simply engages the cam surface 81F on the back side of the trip lever 8, such as in Fig. 5. In this circumstance, the switch disk 68 is at a point farthest removed from the related switch contacts, and the spring arrangement associated with the switch disc as above described is effective to press the trip lever 80 outward toward the trip 83. The relative inclination of the trip lever 80 as well as the spacing of this member relative to the trip 83 can be adjusted, and in the present instance this adjustment is made possible through a set screw 78, Figs. 1 and 4, which is threadedly mounted in an ear 79 depending from the bottom of the timer support 70 adjacent the lower end of the trip lever 80. This lower end of the trip lever 80 is formed with an inclined face 81L which is adapted to be engaged by the set screw 78, and from this it will be seen that the adjusted position of the set screw 78 is adapted to determine the extent to which the spring 66 is effective to locate the trip lever 80 on the pivot 69 with respect to the cam surface 83F on the trip 83.

Under and in accordance with the present invention, the two pneumatically operable cylinders and pistons are adapted to be actuated substantially simultaneously. Thus, air is supplied to the two cylinders 91 and 96, under pressure sufficient to drive the pistons 90 and 95, and in the present instance air is thus directed through a corresponding pair of air lines 107 and 108 which are connected to a common T-fitting T. The fitting T is adapted to direct air from the main source to the cylinders 91 and 96 through the lines 107 and 108, and to this end the main air line 100, connected to said source, leads in to a three-way foot valve 100V, and from the other side of the valve 100V, an air line 109 leads in to a known type of exhaust valve 115. At the other side of the valve 115 is an air line 110 which connects on to the fitting T. The foot valve 100V is normally closed so that line 109 is shut off from source, and is controlled through a pedal P so that when the pedal P is depressed by the operator, the valve 100V is opened and line 109 is connected to the source of compressed air through the main supply line 100.

As best shown in Fig. 5, the exhaust valve 115 includes an inlet 113 to which one end of the line 109 is connected, and also an outlet 114 at the other side to which the end of the line 110 opposite the fitting T is connected. Valve 115 is adapted to permit line 110 to exhaust through the valve 115 rather than the valve 100V when the latter is closed after having once been opened, and to this end includes a vent or exhaust opening 116 over which a spring biased valve member 117 is placed to maintain the vent 116 normally open. The arrangement of the parts in the valve 115 thus described is such that the valve member 117 normally closes off an interior chamber 118 in the valve 115, corresponding to the air line 109, from another interior chamber 119, corresponding to the air line 110, thus placing the vent 116 and the chamber 119 in communication with the air line 110. When the pedal P is depressed to open the valve 100V, air under pressure enters chamber 118 and depresses the valve member 117, closing off the vent 116 and placing the chambers 118 and 119 in communication with line 110. As a consequence, compressed air flows from the primary line 109 through the exhaust valve 115 and the intermediate line 110 to the T-fitting T where it is directed simultaneously to the cylinders 91 and 96, as described above.

In connection with the release of the pedal P to close the valve 100V, it will be appreciated that venting of the line 109 takes place in the usual manner, but the valve 115 permits separate venting of the line 110. Thus, when the line 109 is vented as valve 100V is closed, the pressure in the chamber 118 of valve 115 is relieved and, as a consequence, the valve member 117 is biased back to its normal position wherein the chamber 119 is placed in communication with the exhaust opening 116. Accordingly, when the valve 100V is closed, as above described, the compressed air in line 110 is exhausted through the exhaust opening 116.

Under and in accordance with the present invention, the piston 90 is so arranged that its rate of travel may be adjusted to accordingly permit the time during which the switch SW is closed to be regulated. In the present instance, such regulation of the rate of travel for the piston 90 is established by means of an adjustable needle valve 120, Fig. 1, which is located between the inlet 93 of the cylinder 91 and the end of the air line 107 corresponding thereto. Thus, the air line 107 leads from one of the connections on the fitting T to an inlet 121 on the valve 120. The valve 120 includes an interior valve chamber 122 which is in communication with the opening 121, and a needle valve member 123 of the usual kind is so arranged in this chamber as to be adjustable toward and away from the opening 93 in the cylinder 91. The valve member 123 includes a knurled head 125, and by turning this head in or out with respect to the opening 93, the effective size of the latter may be adjusted accordingly, and hence the flow or quantity of compressed air entering the cylinder 91 per unit of time may be regulated.

From the foregoing it will be seen that when the valve 100V is opened, air under pressure is supplied to both cylinders 91 and 96 through valve 115, fitting T and valve 120. Hence, the piston 95 for the electrode carrying arm 25 will be advanced upwardly and the welding electrodes 22 and 23 will be brought together. During movement of the piston 95 in an actuated direction, the compressed air entering cylinder 91 through the valve 120 will be effective to advance the piston 90 in a vertically upward direction, and as this occurs, the cam face 83F at the forward end of the trip 83 travels along the cam face 81F at the back of the trip lever 80. This action between the trip 83 and the trip lever 80 causes the latter to pivot counterclockwise, as viewed in Fig. 4, about the pivot 69, and the slide plunger 66 is gradually forced in the direction of the switch SW. During movement of the slide plunger 66 toward the switch SW, the spring 66S thereon gradually compresses against the back side of the guide head 71, and at the same time the slide plunger is effective to advance the drive shaft 65 and the switch disk 68 thereon toward the contacts 55C and 57C. As the trip continues to slide along the back of the trip lever, the switch disk 68 eventually engages and bridges the contacts 55C and 57C, whereupon the circuit to the transformer 60 is completed, and the timing and arrangement of parts in this respect is such that the switch SW is thus closed just after the electrodes 22 and 23 engage the opposite sides of the article to be welded. At the time when the switch SW is closed by the switch disc, the trip 83 is still advancing upwardly along the cam face 81F on the trip lever 80, and of course the switch SW will remain closed so long as this relation exists.

In order that the cam faces 81F and 83F may thus remain engaged for a predetermined portion of travel of the piston 90 after switch SW is once closed, to hold the switch closed for a corresponding predetermined time period, spring 65S is so selected and arranged as to permit the slide plunger 66 to move relatively along the shaft 65, causing spring 65S to compress against the back of the switch disk 68. With such a lost motion arrangement for driving the switch disc 68, the trip 83 is effective on the trip lever 80 to hold the switch SW closed for a measurable period of time.

Once the piston 90 is effective to carry the trip 83 past the upper limit of the cam face 81F, the two springs 65S and 66S expand and force the trip lever 80 in a clockwise direction to its normal limit position, as defined by the adjustable set screw 78. Accordingly, switch SW opens, breaking the circuit to the transformer 60, and the welding electrodes 22 and 23 are no longer supplied with current. However, the piston 90 continues to travel vertically upward while guided by the two plates 72 and 19P, and this action continues so long as the pressure of the compressed air in the cylinder 91 exceeds the return action of the spring 90S which, during the vertically upward travel of the piston 90, is compressed against the underside of the guide plate 19P.

After the welding operation is thus completed during the period that the switch SW is held closed by the trip 83, the pedal P is released, thus closing the valve 100V. The springs 30S which are connected to the rear of the lever arm 48 are thereupon effective to pivot arm 25 clockwise as viewed in Figs. 1 and 5 and return the piston 95 to its normal position within the cylinder 96. Simultaneously with the release of compressed air in the cylinders and return action of the piston 95, spring 92S, being no longer overbalanced, is effective to return the piston 90 to its normal position within the cylinder 91, and the return action of the latter is expedited by a known type of release spring 123S in the valve 120 which permits the valve member 123 to be relieved rearwardly by the flow of compressed air out or back through the opening 93.

It will be realized from the foregoing that the adjustable needle valve member 123 may be adjusted relative to the opening 93 to regulate, to a corresponding degree, the speed of travel of the piston 90 past the trip lever 80. Thus, by opening the needle valve 120 to a greater degree the piston 90, when the valve 100V is opened, will travel at a faster rate than before. Consequently, the trip 83 will travel upwardly along the cam face 81F for a shorter period, and this in turn will result in a shorter period of time during which the switch SW is held closed. On the other hand, by turning the needle valve member 123 further inward in the inlet 93, less compressed air will be directed into the cylinder 91, and hence the piston 90 will travel vertically upward at a slower rate. As a consequence of this latter setting for the valve 120, the trip 83 will travel at a slower rate along the cam face 81F and hence the switch SW will remain closed for a greater period of time than before. In each of the two circumstances thus set forth for the piston 90, it will be seen that in one case the welding electrodes 22 and 23 pass current through the article to be welded for a relatively short period of time whereas, in the second case the current flows for a longer period of time and consequently the temperature developed during the resistance welding operation will be higher in the second case than in the first.

From the foregoing it will be seen that the present invention permits resistance welders to be pneumatically operated and controlled from a common source of compressed air. The present invention also permits the welding time to be accurately controlled within relatively precise limits, and at the same time permits uniform pressures to be established between the welding electrodes.

I claim:

1. In an electrical resistance welder having a pair of opposed welding electrodes mounted in respective arms and a transformer for supplying current to the electrodes to establish welding temperatures, a pivot for one of said arms to permit the electrodes to be brought together with substantial pressure in a welding relationship, a cylinder having a pneumatically operable piston for acting on said one arm beyond the pivot therefor, a normally open switch for connecting the transformer to a source of electric power to thereby supply current in operative amounts to the electrodes when the latter are in said welding relationship, a pivoted lever adapted to close said switch and including a cam surface thereon, another cylinder having a pneumatically operable piston arranged to travel adjacent said switch and including a one-way trip thereon adapted to engage and ride along the cam surface on said lever to hold the switch closed for a predetermined portion of travel of the second-named piston in one direction until the one-way trip passes off said cam surface while moving in said one direction, means to return said switch to open position after said trip has been carried past said lever by the second-named piston, an adjustable valve associated with the second-named cylinder and piston to regulate its rate of travel and thereby the time period during which the switch is held closed as aforesaid, and means to adjust said lever on the pivot therefor to increase and decrease the amount of travel of said trip on the cam surface of said lever.

2. In an electrical resistance welder having a pair of opposed welding electrodes mounted in respective arms and a transformer for supplying current to the electrodes to establish welding temperatures, a pivot for one of said arms to permit the electrodes to be brought together with substantial pressure in a welding relationship, a cylinder having a piston operatively arranged therewith for acting on said one arm beyond the pivot therefor to actuate said arm and thereby establish said welding relationship, a normally open switch for connecting the transformer to a source of electric power to supply current in operative amounts to the electrodes for resistance welding, a pivoted lever for actuating said switch when pivoted in one direction and including a cam surface thereon, another cylinder having a piston operatively arranged therewith and including a one-way trip disposed opposite said lever in position to travel in a vertical upward direction along the cam surface of said lever and pivot said lever in the said one direction to hold said switch closed for a predetermined portion of travel of the second-named piston until said one-way trip passes off the cam surface on said lever while moving in said upward direction, means to return said switch to open position at the end of said predetermined portion of travel for the second-named piston, pneumatic lines leading into said cylinders and adapted to be supplied with compressed air, an adjustable valve in the pneumatic line leading to the second-named cylinder to regulate the flow of compressed air to such cylinder and thereby the rate of travel of the second-named piston and the time period during which said switch is held closed as aforesaid, and means to adjust said lever on the pivot therefor toward and away from said trip to regulate the amount of travel of said trip along the cam surface of said lever.

3. In an electrical resistance welder having a pair of opposed welding electrodes and means for bringing said electrodes together into welding engagement with the work piece, and a transformer for supplying current to the electrodes sufficient to establish a resistance weld on said work piece, a normally open switch adapted to connect said transformer to a source of electric power, a lever for actuating said switch when operated in one direction, a pneumatically operable piston and cylinder arranged adjacent said switch so that when actuated in either direction the piston is adapted to travel along a path adjacent the switch, a trip carried by said piston in position to engage and operate said lever in the said one direction therefor and to hold the switch in a closed position during a predetermined portion of the travel of the second-named piston in an advancing direction past said lever, a pneumatic line connected to said cylinder for directing air under pressure thereto, an adjustable valve in said line adapted to control the flow of air to said cylinder and thereby regulate the rate of travel of said piston in an advancing direction and the time period during which said switch is held closed, means to position said lever relative to said trip, and means to operate said lever in an opposite direction to open said switch after said trip has passed off said lever when moving in said advancing direction.

4. In an electrical resistance welder having a pair of opposed welding electrodes mounted in respective arms and a transformer for supplying current to the electrodes to establish welding temperatures, a pivot for one of said arms to permit the electrodes to be brought together with substantial pressure in a welding relationship, a pneumatically operable piston for acting on said arm beyond the pivot therefor, a switch spring-biased to a normally open position for connecting the transformer to a source of electric power to thereby supply current in operative amounts to the electrodes when the latter are in said welding relationship, a pivotally mounted lever adapted to close said switch against said spring when pivoted in one direction and including a cam surface, a pneumatically operable piston arranged to travel adjacent said switch in advancing and reverse directions, a one-way trip carried on the second-named piston and adapted to engage the cam surface on said lever and pivot said lever in the said one direction therefor to hold the switch closed for a predetermined portion of travel of the second-named piston, said spring being operative to return said switch to open position after said trip has been carried past said lever during advancing movement of the second-named piston, means to adjust said lever on the pivot therefor to regulate the extent to which the trip engages said cam surface, and a valve to regulate the rate of travel of the second-named piston to correspondingly adjust the speed with which said trip travels on said cam surface.

References Cited in the file of this patent

UNITED STATES PATENTS

| | | |
|---|---|---|
| 2,283,826 | Soehner | May 19, 1942 |
| 2,305,591 | Sonneborn | Dec. 22, 1942 |